US012683064B2

(12) United States Patent
Sakamoto

(10) Patent No.: US 12,683,064 B2
(45) Date of Patent: Jul. 14, 2026

(54) REACTOR

(71) Applicant: Tamura Corporation, Tokyo (JP)

(72) Inventor: Kazuki Sakamoto, Saitama (JP)

(73) Assignee: TAMURA CORPORATION (JP)

( * ) Notice: Subject to any disclaimer, the term of this patent is extended or adjusted under 35 U.S.C. 154(b) by 571 days.

(21) Appl. No.: 18/224,428

(22) Filed: Jul. 20, 2023

(65) Prior Publication Data

US 2024/0038438 A1 Feb. 1, 2024

(30) Foreign Application Priority Data

Jul. 27, 2022 (JP) ................................ 2022-119498

(51) Int. Cl.

| | |
|---|---|
| ***H01F 27/28*** | (2006.01) |
| ***H01F 27/02*** | (2006.01) |
| ***H01F 27/30*** | (2006.01) |
| ***H01F 37/00*** | (2006.01) |

(52) U.S. Cl.

CPC ......... *H01F 27/2828* (2013.01); *H01F 27/30* (2013.01); *H01F 37/00* (2013.01); *H01F 27/02* (2013.01)

(58) Field of Classification Search

CPC ...... H01F 27/2828; H01F 27/30; H01F 37/00; H01F 27/02; H01F 27/022; H01F 27/025; H01F 27/26

USPC ..................................................... 336/65, 90

See application file for complete search history.

(56) References Cited

U.S. PATENT DOCUMENTS 4,363,014 A * 12/1982 Leach ....................... H01F 5/04 336/208
2016/0035475 A1* 2/2016 Maeno .................... H01F 37/00 336/208
2022/0319768 A1* 10/2022 Harata .................. H01F 27/325

FOREIGN PATENT DOCUMENTS

JP S55-12727 A 1/1980
JP 2020047918 A * 3/2020
JP 2020136598 A * 8/2020
JP 2022036912 A * 3/2022

* cited by examiner

*Primary Examiner* — Kenneth Whittington
(74) *Attorney, Agent, or Firm* — Snell & Wilmer LLP

(57) ABSTRACT

Reactor 10 includes the core 4, the coil 2 attached to the core 4, the resin member 5 covering a periphery of the core 4, and the fastening portion 53 fastening the external terminal 61 of the external device electrically connected to the coil 2. The external terminal 61 is connected to the lead wire 62 connecting the external terminal 61 and the external device. The lead wire 62 is wired linearly above the core 4 along the core 4 to which the coil 2 is not attached. The resin member 5 includes the guide portion 54 provided at an opposite of the fastening portion 53 so as to interpose the core 4 above which the lead wire 62 is wired and holding the lead wire 62 and the intermediate guide portion 55 provided between the fastening portion 53 and the guide portion 54 and holding the lead wire 62.

6 Claims, 5 Drawing Sheets

REACTOR

CROSS-REFERENCE TO RELATED APPLICATION

This application is based upon and claims the benefit of priority from Japan Patent Application No. 2022-119498, filed on Jul. 27, 2022, the entire contents of which are incorporated herein by reference.

FIELD OF INVENTION

The present disclosure relates to a reactor.

BACKGROUND

Reactors are used in various applications such as OA equipment, solar power generation system, vehicles, and uninterruptible power supplies. A reactor is an electromagnetic component that converts electric energy into magnetic energy for accumulation and release. The reactor of this type is known in which periphery of a core is covered with a resin member and a coil is mounted on an outer periphery of the resin member in order to insulate the core and the coil.

To the reactor, electric power is supplied from the external devices. An external device has an external terminal electrically connected to the coil and a lead wire connecting the external terminal and the external device. The external device and the reactor are electrically connected by connecting the external terminal to a bus bar or the like. In this way, power is supplied from the external device to the reactor, current flows through the coil, magnetic flux is generated that penetrates the coil, and a closed magnetic circuit is formed in the core.

SUMMARY OF INVENTION

Problems to be Solved by Invention

When the lead wires are wired without being fixed, they may move due to vibration and interfere with reactor members or electrical equipment other than the reactor. Therefore, the lead wires are required to be fixed so as not to move. The lead wires are fixed to predetermined fixed locations with binding bands or the like. As a result, a number of parts increases and fixing work takes a long time, resulting in poor production efficiency.

The present disclosure is achieved to address the above-described problem, and the objective is to provide a reactor that can easily fix lead wires of external devices without increasing a number of parts.

Means to Solve the Problem

To achieve the above objective, a reactor of the present disclosure includes:

a core;

a coil attached to the core;

a resin member covering a periphery of the core; and a fastening portion fastening an external terminal of an external device electrically connected to the coil, in which the external terminal is connected to a lead wire connecting the external terminal and the external device; and the lead wire is wired linearly above the core to which the coil is not attached, in which the resin member comprising:

a guide portion provided at an opposite of the fastening portion so as to interpose the core above which the lead wire is wired and holding the lead wire; and an intermediate guide portion provided between the fastening portion and the guide portion and holding the lead wire.

Effect of Invention

The reactor that can easily fix lead wires of external devices without increasing a number of parts can be provided.

BRIEF DESCRIPTION OF DRAWINGS

FIG. 2A is a perspective view illustrating an entire configuration, and FIG. 2B is an exploded perspective view of the mold core.

EMBODIMENTS

Embodiment

Figure 1:
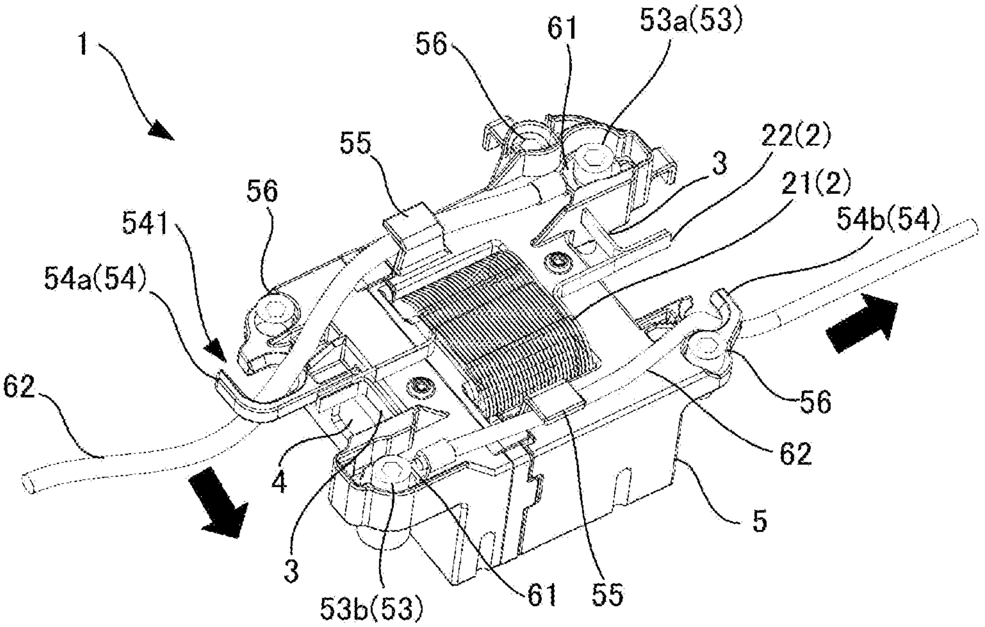
FIG. 1 is a perspective view illustrating an entire configuration of the reactor body.

A reactor according to the embodiment will be described with reference to the figures. FIG. 1 is the perspective view illustrating the entire configuration of the reactor body. In each drawing, for ease of understanding, there are cases where thickness, dimensions, positional relationships, ratios, shapes, etc. may be emphasized, and the present disclosure is not limited thereto. In addition, a direction perpendicular to a winding axis direction of a coil which is a laterally-aligned-direction of legs of a core is called a width direction, and the direction perpendicular to the winding axis direction and the width direction of the coil is called a height direction or a vertical direction, and when the reactor body is accommodated in a case, a direction toward a bottom surface of the case is called a downward direction, and a direction away from the bottom surface of the case is called the upward direction. These directions are expressions for indicating the positional relationship of each component of the reactor, and do not limit the positional relationship and direction in which the reactor is installed on the installation target.

Reactor 10 is an electromagnetic component that converts electric energy into magnetic energy for accumulation and release and is used in various application such as OA equipment, solar power generation system, and vehicles. As illustrated in FIG. 1, reactor 10 includes the reactor body 1. The reactor body 1 has a coil 2, bus bar 3, core 4, and resin member 5.

The coil 2 has a wound body 21 in which a conductive member coated with an insulating coating such as enamel coating is wound into a cylindrical shape. The wound body 21 is formed by helically winding along a winding axis while shifting its winding position for each turn. The wound body 21 is attached to the core 4.

The conductive member of the coil 2 is, for example, a flat rectangular wire, and the conductive member is wound so that a wide surface of the conductive member spreads in the direction perpendicular to the winding axis of the coil 2, forming a helical edgewise coil. However, wire material and winding method of the coil 2 are not limited to the flat rectangular wire edgewise coil, and other forms may be used. A lead wire 22 extends parallel to the winding axis from an end surface of the wound body 21 perpendicular to the winding axis.

The bus bar 3 is a plate conductive member made of copper, aluminum, or the like. The bus bar 3 connects the lead wire 22 of the coil 2 and an external terminal 61 of an external device (not illustrated). One end of bus bar 3 is connected to the lead wire 22 by welding or the like. A circular mounting hole is formed in the other end of the bus bar 3, extends to a fastening portion 53 described later, and is connected to the external terminal 61 (see FIG. 5). When electric power is supplied from the external device, current flows through the coil 2 via the bus bar 3 and magnetic flux is generated.

A dust core, a ferrite core, a laminated steel plate, a metal composite core, or the like can be used for the core 4. The metal composite core is a magnetic body formed by kneading magnetic powder and resin, and curing the resin. The core is a magnetic circuit through which the magnetic flux generated by the coil passes.

Figure 2A:
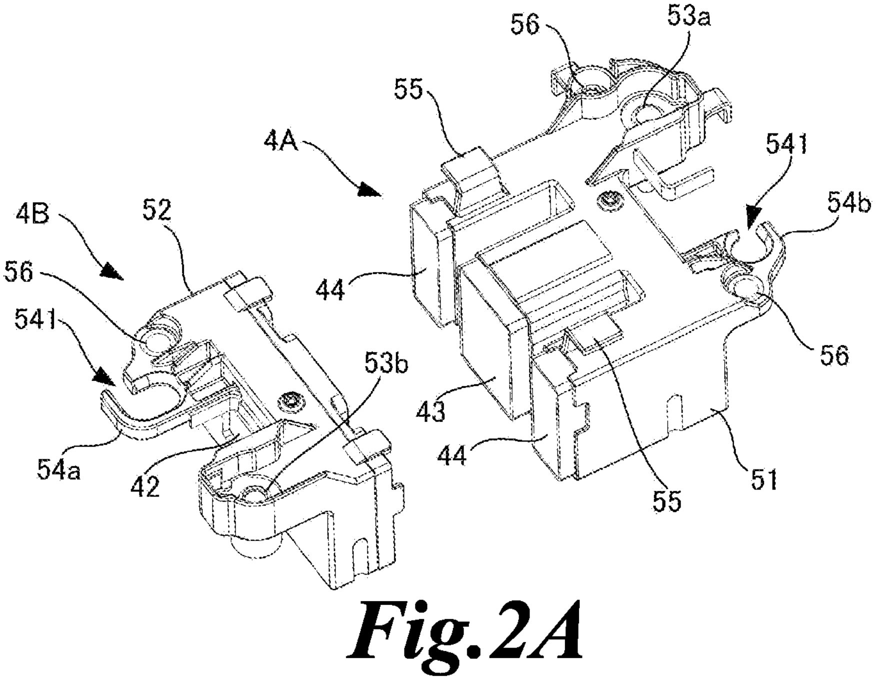
FIGS. 2A and 2B illustrate a mold core.
Figure 2B:
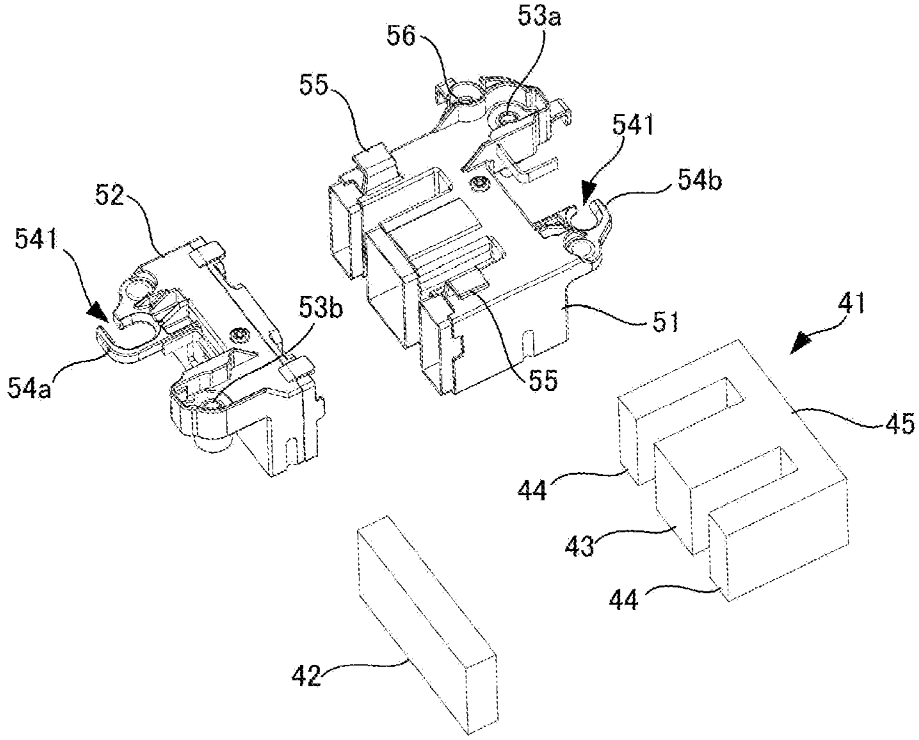

FIG. 2A is the perspective view of the mold core and FIG. 2B is an exploded perspective view of the mold core. The core 4 has an annular shape by joining two core members 41 and 42 together. The core member 41 has a middle leg 43, an outer leg 44 and a yoke portion 45. The middle leg 43 is wound with the coil 2. A pair of outer legs 44 is provided, and is provided side by side with the middle leg 43. The pair of outer legs 44 is provided so as to interpose the middle leg 43 therebetween. The yoke portion 45 connects the middle leg 43 and the pair of outer legs 44. In this way, the core member 41 has an approximately E-shape. The core member 42 has a rectangular parallelepiped shape. By joining the core member 42 and the middle leg 43 and outer legs 44 of the core member 41 with an adhesive, the annular core 4 is formed.

A magnetic gap may be provided at this joining position. A magnetic gap can be a plate-shaped spacer or an air gap. The plate-shaped spacer is, for example, a non-magnetic material, a ceramic such as alumina or zirconia, a non-metal, a resin, a carbon fiber, or a composite material of two or more of these formed into a plate shape, or gap paper. The air gap is a gap without magnetic material.

The resin member 5 covers a periphery of the core 4. The resin member 5 includes resin bodies 51 and 52 covering the core members 41 and 42, respectively, by molding. That is, a mold core 4A including the core member 41 and the resin body 51 and a mold core 4B including the core member 42 and the resin body 52 are formed. The coil 2 is attached to the middle leg 43 of the mold core 4A, and the mold core 4A and the mold core 4B are joined to assemble the reactor body 1.

Types of resin for the resin member 5 may be, for example, epoxy resin, unsaturated polyester resin, urethane resin, BMC (Bulk Molding Compound), PPS (Polyphenylene Sulfide), PBT (Polybutylene Terephthalate), and compositions thereof. Note that thermally conductive filler may be mixed with the resin.

The resin member 5 has a fastening portion 53, a guide portion 54 and an intermediate guide portion 55. The fastening portion 53 connects and fixes the bus bar 3 and the external terminal 61. The fastening portion 53 is a circular hole, and a collar is provided around the hole. The bus bar 3 is arranged on the fastening portion 53 so that the hole of the fastening portion 53 and a mounting hole of the bus bar 3 overlap. The bus bar 3 and the external terminal 61 are connected and fixed by aligning the mounting hole of the bus bar 3 with the hole of the external terminal 61 and screwing them with bolts or the like.

The fastening portion 53 is provided at a corner portion of the reactor body 1 in substantially rectangular shape. A pair of fastening portions 53 is provided. One fastening portion 53*a* is provided at a corner portion of the resin body 51, and the other fastening portion 53*b* is provided at a corner portion of the resin body 52, the pair of fastening portions 53*a* and 53*b* is provided at diagonal corners of the reactor body 1, respectively.

The guide portion 54 is a member that guides a lead wire 62 of an external device that is introduced within a region of the reactor body 1. The term 'within the region of the reactor body 1' refers to within an extension region of the reactor body 1 in the height direction. The guide portion 54 is provided at an opposite corner of the fastening portion 53 so as to interpose the core 4 to which the coil 2 is not attached. The corner opposite to the fastening portion 53 is a position where the guide portion 54 can guide the lead wire 62 of the external device, which will be described later, so as to be wired linearly above the core 4.

A pair of guide portions 54 is provided. One guide portion 54*a* is provided at a corner portion of the resin body 52, and the other guide portion 54*b* is provided at a corner portion of the resin body 51, the pair of guide portions 54*a* and 54*b* is provided at diagonal corners of the reactor body 1, respectively. That is, the fastening portion 53*a* and the guide portion 54*a*, and the fastening portion 53*b* and the guide portion 54*b* are arranged to face each other with the outer leg 44 interposed therebetween.

The guide portion 54 extends outward from a corner portion of the reactor body 1. The guide portion 54 has a ring shape with a circular hole on an inner surface. Axis of the circular hole of the guide portion 54 is parallel to the height direction. A part of the ring-shaped guide portion 54 is notched. That is, the guide portion 54 has a notch portion 541. The notch portion 541 may be large enough to allow the lead wire 62 of the external device to be inserted into the guide portion 54, but preferably has a size substantially equal to the outer diameter of the lead wire 62.

A position of the notch portion 541 is preferably provided in a place that is not in a direction in which the lead wire 62 tends to escape after the lead wire 62 is inserted into the guide portion 54. In this embodiment, the notch portion 541 of the guide portion 54*a* is provided on the side opposite to the fastening portion 53*b*, and the notch portion 541 of the guide portion 54*b* is provided on the fastening portion 53*a* side. The inner diameter of the ring of the guide portion 54 may be appropriately set according to the outer diameter of the lead wire 62.

Figure 3:
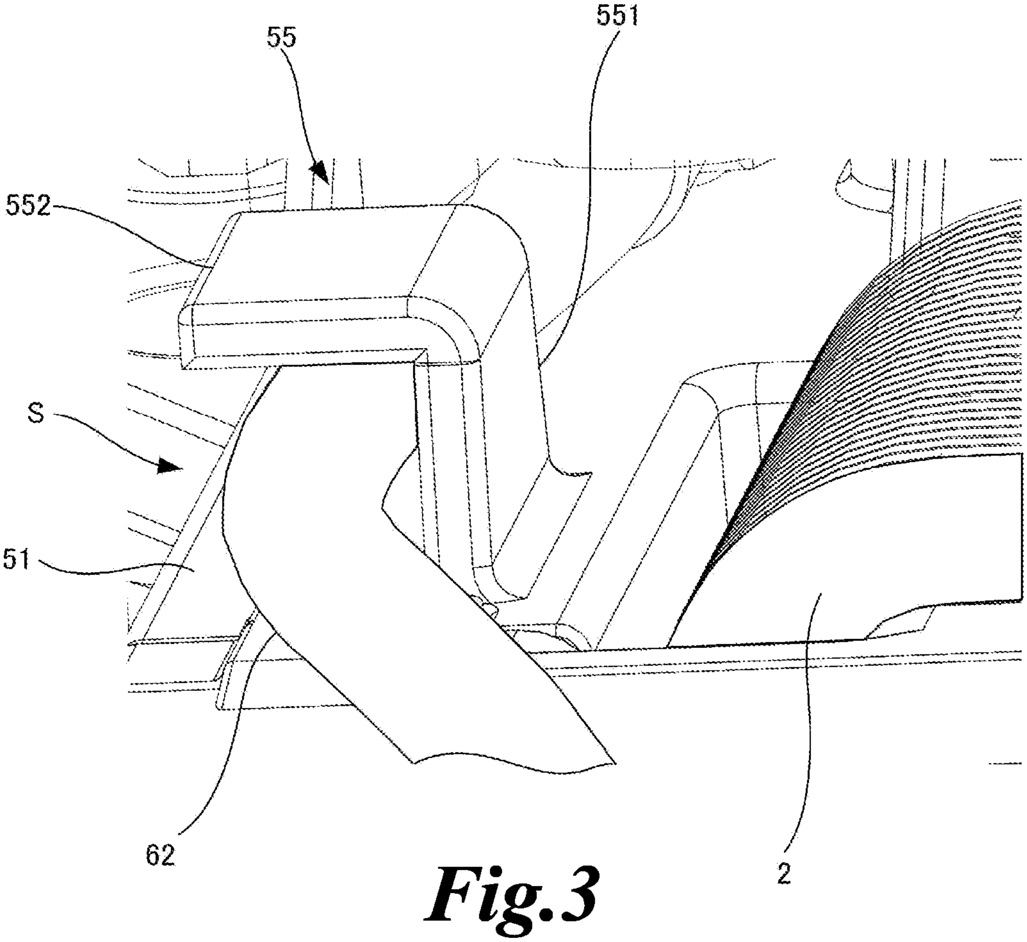
FIG. 3 is an enlarged view of the intermediate guide portion.

The intermediate guide portion 55 is provided between the fastening portion 53 and the guide portion 54 and is a member that guides the lead wire 62 extending between the fastening portion 53 and the guide portion 54. The intermediate guide portion 55 is provided at an intermediate point between the fastening portion 53 and the guide portion 54. That is, the intermediate guide portion 55 is provided on the outer leg 44. The intermediate guide portion 55 extends upward from the resin member 5 covering the outer leg 44 at a position facing the coil 2. FIG. 3 is the enlarged view of the intermediate guide portion 55. The intermediate guide portion 55, as shown in FIG. 3, has a wall portion 551 and a canopy portion 552.

The wall portion 551 extends upward from an upper surface of the resin body 51 covering the outer leg 44. The length of the wall portion 551 in the extending direction is equal to or greater than the outer diameter of the lead wire 62. The wall portion 551 is arranged to face the coil 2. The canopy portion 552 extends from the extended tip of the wall portion 551 in a direction orthogonal to the wall portion 551, and faces the upper surface of the resin body 51 covering the outer leg 44. The canopy portion 552 extends in a direction opposite to the coil 2, that is, in a direction away from the coil 2. The length of the canopy portion 552 in an extending direction is preferably longer than the outer diameter of the lead wire 62. No member is provided between the tip of the canopy portion 552 and the upper surface of the resin body 51, and a gap S is provided. That is, the gap S is provided so as to face the wall portion 551 at a position farther from the coil 2 than the wall portion 551. The lead wire 62 is inserted through this gap S, and the lead wire 62 is accommodated in a space surrounded by the upper surface of the resin body 51, the wall portion 551 and the canopy portion 552.

In addition, the resin member 5 further includes a fixing portion 56. The fixing portion 56 fixes the reactor body 1 to a case 7. The case 7 also include a fixing portion at a position corresponding to the fixing portion 56, and by overlapping the fixing portion 56 of the resin member 5 and the fixing portion of the case 7 and fastening them with screws or the like, the reactor body 1 can be fixed to the case 7.

The external device (not illustrated) is a member that is electrically connected to the coil 2 and supplies power to the reactor 10. The external device includes external terminals 61 and lead wires 62. The external terminal 61 includes a conductive member. A mounting hole is formed in the external terminal 61, and the external terminal 61 is provided on the bus bar 3 so that the mounting hole overlaps with the mounting hole of the bus bar 3.

The lead wire 62 is a member that connects the external terminal 61 and the external device. That is, one end of the lead wire 62 is connected to the external terminal 61, and the other end is connected to the external device. The lead wire 62 is wired above the outer leg 44 along the winding axis direction from the fastening portion 53. That is, the lead wire 62 extends linearly along the winding axis direction. Here, linearly does not mean a completely straight state, but rather a state in which it is not greatly curved or bent, it also includes a state in which it is slightly curved or bent in order to be held by the guide portion 54 or the intermediate guide portion 55.

The lead wire 62 includes a metal wire and a covering portion covering it. Metal wire may include, for example, copper, nickel, aluminum, silver, gold, or two or more thereof. The metal wire can be a single solid wire or a multi-strand wire. The covering portion covers the metal wire with an insulating member such as vinyl, silicone rubber, fluororubber, or the like.

Figure 4:
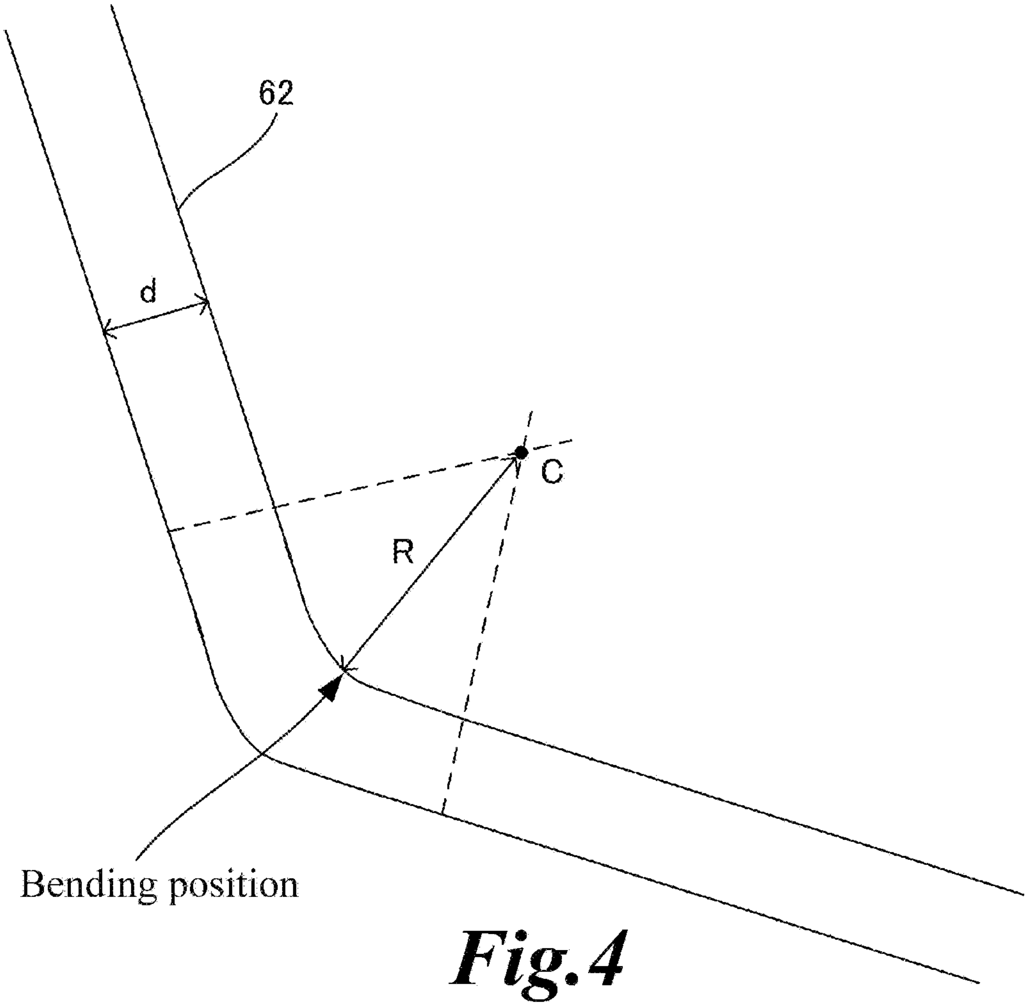
FIG. 4 is a schematic diagram illustrating a radius R from a bending position to a bending center.

As illustrated in FIG. 4, when a diameter of the lead wire 62 including the covering portion is d (mm) and the radius from the bending position to the bending center C is R (mm), R>3d is satisfied. It is preferable to satisfy this condition. Since the lead wire 62 has high rigidity, it is difficult to deform such as bending.

Figure 5:
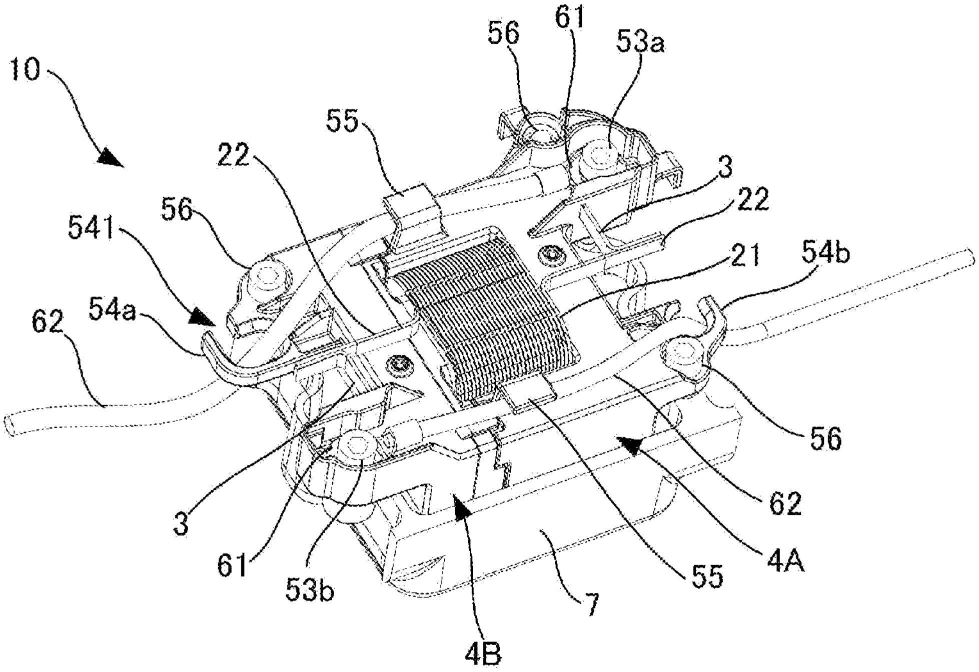
FIG. 5 is a perspective view illustrating an entire configuration of the reactor in which a reactor body is housed in a case.

FIG. 5 is the perspective view illustrating the entire configuration of the reactor 10. As illustrated in FIG. 5, the reactor 10 includes the case 7. The case 7 accommodates the reactor body 1. The case 7 is made of a metal having high thermal conductivity and light weight, such as an aluminum alloy, and has heat dissipation properties. It should be noted that the case 7 does not necessarily have to be made of metal, and resin with excellent thermal conductivity, resin with a metal heat sink embedded in a part of the resin, or resin containing metal filler may be used.

The case 7 has a box shape with an open top. Specifically, the case 7 includes a substantially rectangular bottom surface with four sides and four side walls rising from the edges of the four sides of the bottom surface, and the top surface is open. A space surrounded by the bottom surface and the side walls is a housing space for accommodating the reactor body 1. The reactor body 1 is inserted into the housing space of the case 7 through the opening on the upper surface of the case 7.

After the reactor body 1 is accommodated in the case 7, the case 7 may be filled with filler. As the filler, a relatively soft resin with high thermal conductivity is suitable in order to ensure a heat dissipation performance of the reactor body 1 and to reduce vibration propagation. Specific examples include silicone resin, urethane resin, epoxy resin, acrylic resin, or the like. By filling the filler, a filling molding portion is formed in a gap between the case 7 and the reactor body 1 by solidifying the filler. Therefore, heat generated from the reactor body 1 can be propagated to the case 7 through the filling molding portion, and the heat dissipation of the reactor 10 is improved.

(Wiring of Lead Wires)

The external terminal 61 of the external device is overlapped on the bus bar 3 arranged in the fastening portion 53 and fastened with a bolt or the like. As a result, the external terminal 61 and the bus bar 3 are connected and fixed. The lead wire 62 connected to the external terminal 61 extends along the outer leg 44 and is accommodated from the gap S of the intermediate guide portion 55 in the space surrounded by the upper surface of the resin body 51, the wall portion 551, and the canopy portion 552, and held in it. At this time, since the wall portion 551 is provided between the lead wire 62 and the coil 2, even if the lead wire 62 moves due to vibration of the reactor 10 or the like, an insulation distance from the coil 2 can be secured.

The lead wire 62 arranged at the corner opposite to the fastening portion 53 is accommodated in the guide portion 54 from the notch portion 541 and held by the guide portion 54. At this time, as indicated by the arrows in FIG. 1, the lead wire 62 held by the guide portion **54*a* tries to move toward the fastening portion 53*b*, and the lead wire 62 held by the guide portion 54*b* tries to move toward the outer side of the reactor 10 in the winding axis direction. This direction of movement is also called escape direction. However, the notch portion 541 of each guide portion 54 is not provided in this escape direction, and the lead wire 62 is held by the guide portion 54. Therefore, it is possible to prevent the lead wire 62 from coming out of the guide portion 54**.

Specifically, as to the lead wire 62 of the present embodiment, when a diameter of the lead wire 62 including the covering portion is d (mm) and the radius from the bending position to the bending center is R (mm), R>3d is satisfied. That is, the lead wire 62 is difficult to bend. Therefore, when the lead wire 62 is bent and arranged, it takes a long time and the productivity deteriorates. However, in the present embodiment, the lead wires 62 are wired linearly along the outer legs 44, so bending work by an operator is not necessary, and the productivity is improved. In this way, the present disclosure is more effective when using lead wires 62 that are difficult to bend.

(Effect)

As described above, the reactor 10 of the present embodiment includes the core 4, the coil 2 attached to the core 4, the resin member 5 covering a periphery of the core 4, and the fastening portion 53 fastening the external terminal 61 of the external device electrically connected to the coil 2.

The external terminal includes the lead wire 62 connecting the external terminal and the lead wire 62 is wired linearly above the outer leg 44 along the outer leg 44 to which the coil 2 is not attached. The resin member 5 includes the guide portion 54 provided at an opposite of the fastening portion 53 so as to interpose the outer leg 44 above which the lead wire 62 is wired and holding the lead wire 62 and the intermediate guide portion 55 provided between the fastening portion 53 and the guide portion 54 and holding the lead wire 62.

As a result, the lead wire 62 can be fixed simply by inserting the lead wire 62 into the guide portion 54 and the intermediate guide portion 55, and work efficiency is improved. In addition, since it is not fixed by a binding band or the like unlike the prior art, the number of parts can be reduced, and the production cost can be reduced.

The intermediate guide portion 55 includes the wall portion 551 arranged to face the coil 2 and extending upward from the resin member 5 and the canopy portion 552 extending from a tip of the wall portion 551 in a direction opposite to the coil 2.

In this way, since the wall portion 551 is provided between the lead wire 62 and the coil 2, even if the lead wire 62 moves due to vibration of the reactor 10 or the like, the wall portion 551 acts as a barrier and can prevent interference with the coil 2. Moreover, by providing the canopy portion 552, it is possible to prevent the lead wire 62 from climbing over the wall portion 551 and interfering with the coil 2.

The lead wire 62 includes a metal wire and a covering portion covering the metal wire. In addition, when a diameter of the lead wire 62 including the covering portion is d (mm) and the radius from the bending position to the bending center is R (mm), R>3d is satisfied. Accordingly, the lead wire 62 is difficult to bend. In this embodiment, the lead wire 62 extends linearly along the outer leg 44, so that the work to greatly curve or bent it is not required, and it is simply fixed to the guide portion 54 and the intermediate guide portion 55. Therefore, wiring of lead wires can be easily performed.

The guide portion 54 includes the notch portion 541 allowing the lead wire 62 to be inserted into the guide portion 54 and a size of the notch portion 541 is substantially equal to the outer diameter of the lead wire 62. As a result, the workability of wiring the lead wire 62 is improved, and it is possible to prevent the lead wire 62 from falling out of the guide portion 54.

When the size of the notch portion 541 is larger than the outer diameter of the lead wire 62, the lead wire 62 can be easily inserted into the guide portion 54 from the notch portion 541, however when the lead wire 62 moves due to vibration of the reactor 10 or the like, the lead wire 62 may fall out of the notch portion 541. On the other hand, when the size of the notch portion 541 is smaller than the outer diameter of the lead wire 62, it is possible to prevent the lead wire 62 from falling off even if it moves, however it takes time to insert the lead wire 62 into the guide portion 54. Therefore, by setting the size of the notch portion 541 to be substantially the same as the outer diameter of the lead wire 62, the wiring work of the lead wire 62 can be efficiently performed, and at the same time, the lead wire 62 inserted into the guide portion 54 can be prevented from slipping out of the notch portion 541.

Other Embodiment

In the description herein, although embodiments according to the present disclosure are described, said embodiments are only provided as examples and are not intended to limit the scope of claims. The above-described embodiments may be implemented by other various forms, and various omissions, replacements, and changes may be made without departing from the scope of claims. The embodiments and modifications thereof are included in the invention described in the claims and equivalent ranges thereto, as well as in the scope and abstract of the invention.

In the present embodiment, although the lead wire 62 extends linearly along the outer leg 44 so as to be parallel to the winding axis direction, it is not limited to this, and it may extend along the yoke portion 45 of the core member 41, or the core member 42. That is, the lead wire 62 extending from the fastening portion 53*a* may extend along the yoke portion 45 toward the guide portion 54*b* of the resin body 51, and the lead wire 62 extending from the fastening portion 53*b* may extend along the resin body 52 (core member 42) toward the guide portion 54*a* of the resin body 52.

In the present embodiment, although only one intermediate guide portion 55 is provided between the fastening portion 53 and the guide portion 54, two or more may be provided.

REFERENCE SIGN

10: reactor
1: reactor body
2: coil
21: wound body
22: lead wire
3: bus bar
4: core
41: core member
42: core member
43: middle leg
44: outer leg
45: yoke portion
4A: mold core
4B: mold core
5: resin member
51: resin body
52: resin body
53, 53*a*, 53*b*: fastening portion
54, 54*a*, 54*b*: guide portion
55: intermediate guide portion
61: external terminal
62: lead wire
S: gap
7: case

What is claimed is:

1. A reactor comprising:
a core;
a coil attached to the core;
a resin member covering a periphery of the core; and
a fastening portion fastening an external terminal of an external device electrically connected to the coil,
wherein the external terminal is connected to a lead wire connecting the external terminal and the external device; and
the lead wire is wired linearly above the core to which the coil is not attached, wherein the resin member comprising:

a guide portion provided at an opposite of the fastening portion so as to interpose the core above which the lead wire is wired and holding the lead wire; and an intermediate guide portion provided between the fastening portion and the guide portion and holding the lead wire.

2. The reactor according to claim 1, wherein the intermediate guide portion comprising:

a wall portion arranged to face the coil and extending upward from the resin member; and a canopy portion extending from a tip of the wall portion in a direction opposite to the coil.

3. The reactor according to claim 1, wherein the lead wire comprising:

a metal wire; and a covering portion covering the metal wire, wherein when a diameter of the lead wire including the covering portion is d (mm) and a radius from a bending position to a bending center is R (mm), R>3d is satisfied.

4. The reactor according to claim 2, wherein the lead wire comprising:

a metal wire; and a covering portion covering the metal wire, wherein when a diameter of the lead wire including the covering portion is d (mm) and a radius from a bending position to a bending center is R (mm), R>3d is satisfied.

5. The reactor according to claim 1, wherein:

the guide portion includes a notch portion allowing the lead wire to be inserted into the guide portion; and a size of the notch portion is substantially equal to an outer diameter of the lead wire.

6. The reactor according to claim 2, wherein:

the guide portion includes a notch portion allowing the lead wire to be inserted into the guide portion; and a size of the notch portion is substantially equal to an outer diameter of the lead wire.

* * * * *